D. HANCHETT, J. C. DANEY & R. STUART.
VELOCIPEDE.
No. 109,408.
Patented Nov. 22, 1870.
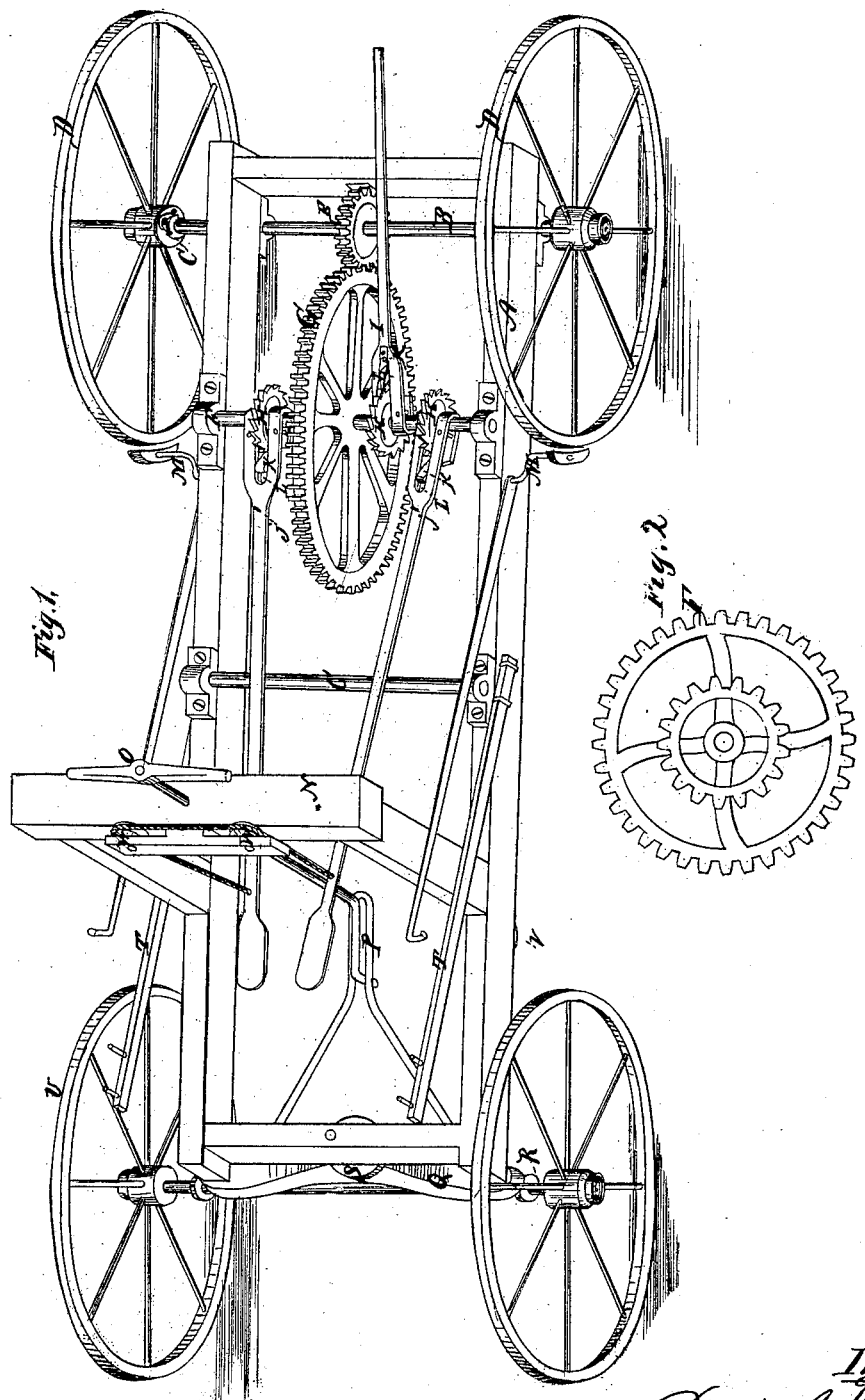
Witnesses
Elwood J. Bolman.
Joseph R. Tussing
Inventor
Daniel Hanchett.
John C. Daney.
Reuben his Stuart.
     mark

UNITED STATES PATENT OFFICE.

DANIEL HANCHETT, JOHN C. DANEY, AND REUBEN STUART, OF SMITHFIELD, ILLINOIS.

IMPROVEMENT IN VELOCIPEDES.

Specification forming part of Letters Patent No. 109,408, dated November 22, 1870.

*To all whom it may concern:*

Be it known that we, DANIEL HANCHETT, JOHN C. DANEY, and REUBEN STUART, of Smithfield, in the county of Fulton, State of Illinois, have invented, jointly, certain new and useful Improvements in Propelling Wheeled Vehicles, of which the following is a specification.

Our invention relates to so applying motive power of and by one's self, by means of a novel combination of cog-wheels, pawls, ratchets, and levers, so as to rapidly propel a four or less wheeled vehicle upon a common dirt road with good speed and considerable load or weight.

In the accompanying drawings, Figure 1 represents a view of our invention as applied to a common buggy. Fig. 2 is a double-gear driving-wheel not seen and illustrated in Fig. 1.

A is the frame, upon which is supported and worked the combination, which should be substantially made.

B is the front axle, attached to and revolves with front wheels, D D, by means of pawls and ratchets, hereinafter described.

C C are pawls, attached to inside of hubs of D D by means of bolts, and drop rearward in ratchet in axle B, causing, in forward motion, the axle and wheel to be relatively fixed and revolve in common, but backward motion of wheel to be independent of axle, as in common wheel.

D D are front wheels, and slip on spindle of axle, as usual, and so attached, but revolve in common with axle, by means of pawls, to hubs and ratchets in axle, as before described.

E is a cog-wheel, firm to and revolves with axle, and working in large drive-wheel G.

G is a large drive cog-wheel working in and communicating its motion to cog-wheel E, by which axle B and wheels D D are caused to revolve in common.

H H H are three ratchet-wheels, firm to axle of and revolve with drive-wheel G, in which ratchets work the forcing-pawls L L L, hereinafter described.

I is a hand-lever, constructed mainly as and for the purpose and to be used as J J, by an assistant, when necessary, with heavy load or other impediment, and removed when not in use, and as readily applied.

J J are foot-levers. By their treadle motion motive power is applied by driver, forcing downward of pawls L L in their ratchets, thereby giving motion to vehicle, the front part being clevis-shaped, terminating with box to fit over axle of ratchet-wheels H H H, and finished in rear for and with strap over foot, and supported jointly by cord, or otherwise working over pulleys W W.

K K are springs attached beneath front end of and to foot-levers J J, and adjusted to support pawls L L, and extending conveniently back, so as to be thrown out of place by driver, when necessary to drop said pawls clear of their ratchets.

L L L are pawls, substantially swung on bolts, through clevis end of hand and foot levers I and J J. Said pawls jut and work downward into ratchets H H H, and by means of the treadle-motion of foot-levers forcing said ratchet-wheels to revolve, thereby propelling vehicle.

M M are common lever-brakes, conveniently attached to frame A, and applied to front wheels, D D.

N is an upright frame, to support guiding-shaft, and should be substantially constructed.

O is the guiding handle and shaft, said shaft conveniently shaped to and ending and working to and fro in slot at P, as seen in Fig. 1, for the purpose of directing vehicle, with aid of P.

P is a V-shaped lever ending at junction of arms in a prolongated slot, to receive lower end of guiding-shaft O, with diverging arms attached to axle R, thereby guiding hind wheels, U U.

Q is a common sand-board attached to axle R and supporting-frame A.

R is the hind axle of vehicle.

S is the fifth-wheel, as in common use in buggies, applied to hind axle.

T T are extended supports to seat of driver.

U U are hind wheels. By their motion to the right or left, by action of shaft O, the course of vehicle is changed as desired.

V V are pulleys for double-gear guiding apparatus. (Not seen in Fig. 1.)

W W are pulleys supporting jointly by cord or otherwise and for conveniently working foot-levers J J.

We claim as our invention—

The combination, with drive-wheel G and its axle, of hand-lever I and foot-levers J J, with their pawls L L L and ratchet-wheels H H H, substantially as and for the purpose hereinbefore set forth.

DANIEL HANCHETT.
JOHN C. DANEY.
REUBEN $\overset{\text{his}}{\times}$ STUART.
mark.

Witnesses:
ELWOOD T. ZOLMAN,
JOSEPH A. TUSSING.